United States Patent [19]

Matsuoka et al.

[11] Patent Number: 5,010,864

[45] Date of Patent: Apr. 30, 1991

[54] IGNITION TIMING CONTROL APPARATUS FOR AN INTERNAL COMBUSTION ENGINE

[75] Inventors: Atsuko Matsuoka; Wataru Fukui, both of Himeji, Japan

[73] Assignee: Mitsubishi Denki Kabushiki Kaisha, Tokyo, Japan

[21] Appl. No.: 421,022

[22] Filed: Oct. 13, 1989

[30] Foreign Application Priority Data

Oct. 13, 1988 [JP] Japan ................................ 63-255834
Oct. 13, 1988 [JP] Japan ................................ 63-255835

[51] Int. Cl.$^5$ .............................................. F02P 5/15
[52] U.S. Cl. ..................................... 123/414; 123/422
[58] Field of Search ................ 123/414, 422, 418, 419

[56] References Cited

U.S. PATENT DOCUMENTS 4,656,993 4/1987 Yuzawa et al. ...................... 123/414
4,700,305 10/1987 Lotterbach et al. ............ 364/431.03

FOREIGN PATENT DOCUMENTS 61-244869 10/1986 Japan ..................................... 123/419

Primary Examiner—Andrew M. Dolinar

Attorney, Agent, or Firm—Sughrue, Mion, Zinn, Macpeak and Seas

[57] ABSTRACT

An ignition timing control apparatus for a multi-cylinder internal combustion engine has a position sensor for generating a series of position signals. Each signal corresponds to one of the cylinders of the engine and indicates a first position and a second position with respect to top dead center of the piston of the corresponding cylinder. The number of degrees of crankshaft rotation between the first and second positions is different for a prescribed reference cylinder of the engine than for the other cylinders of the engine. A cylinder recognizing portion of a microcomputer recognizes the reference cylinder based on the signal from the position sensor. An ignition timing braking portion of the microcomputer performs ignition timing braking when the target ignition timing falls during a prescribed braking period and ignition has yet to take place when a piston reaches its second position. A braking period adjusting portion adjusts the length of the braking period depending on which cylinder is firing and on whether cylinder recognition has been completed.

3 Claims, 11 Drawing Sheets

(a) AFTER CYLINDER RECOGNITION (b) BEFORE CYLINDER RECOGNITION

FIG. 12

IGNITION TIMING CONTROL APPARATUS FOR AN INTERNAL COMBUSTION ENGINE

BACKGROUND OF THE INVENTION

This invention relates to an ignition timing control apparatus for an internal combustion engine. More particularly, it relates to an ignition timing control apparatus which can prevent abnormal ignition from occurring when the engine rotational speed suddenly increases.

Figure 1:
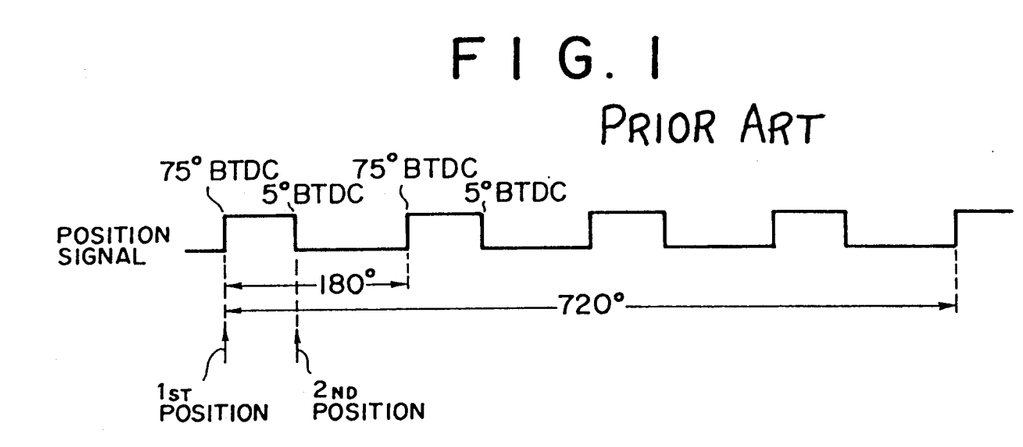
FIG. 1 is a waveform diagram of the output signal of a conventional rotational position sensor.

An internal combustion engine is generally equipped with a rotational position sensor which indicates the position of the piston of each cylinder of the engine. FIG. 1 illustrates the output signal of a typical rotational position sensor. The output signal is in the form of pulses which are generated at prescribed intervals, such as once every 180 degrees of crankshaft rotation. Each pulse corresponds to a specific cylinder of the engine and indicates a prescribed position with respect to top dead center of the piston of the cylinder. For example, in FIG. 1, the rising edge of each pulse occurs when the piston of the corresponding cylinder is at 75° BTDC, while the falling edge occurs when the piston is at 5° BTDC. The ignition timing for each cylinder is normally measured from the rising edge of the corresponding pulse, and ignition is controlled so as to occur a prescribed length of time after the occurrence of the rising edge of a pulse.

Figure 2:
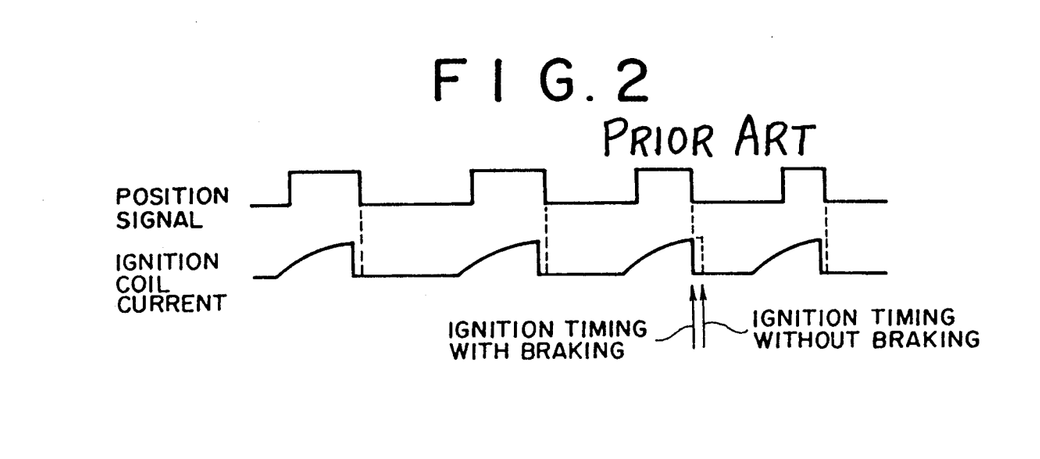
FIG. 2 is a waveform diagram of the output signal of a conventional rotational position sensor and the current in an ignition coil.

FIG. 2 illustrates the output signal of a conventional rotational position sensor for an engine and the current in the ignition coil of the engine. In this example, the ignition timing is set so that ignition occurs prior to the falling edge of an output pulse of the rotational position sensor, i.e., prior to 5° BTDC. However, when the engine rotational speed suddenly increases, if the ignition timing was calculated before the speed increase took place, ignition will end up taking place later in the engine cycle than intended, and may even take place after the falling edge of a pulse, as shown by the dashed lines in FIG. 2. In this case, proper combustion will not take place, and the engine will not generate maximum power.

In order to prevent late ignition when the engine speed suddenly increases, some engines are equipped with a so-called "ignition timing braking device". If ignition has yet to take place at the time of the falling edge of the output pulse of the rotational position sensor, the ignition timing braking device cuts off the ignition coil current and forces ignition to occur. The process of cutting off the ignition coil current in this manner is referred to as "ignition timing braking". In the example of FIG. 2, when ignition timing braking is performed, ignition will take place no later than 5° BTDC.

Figure 3:
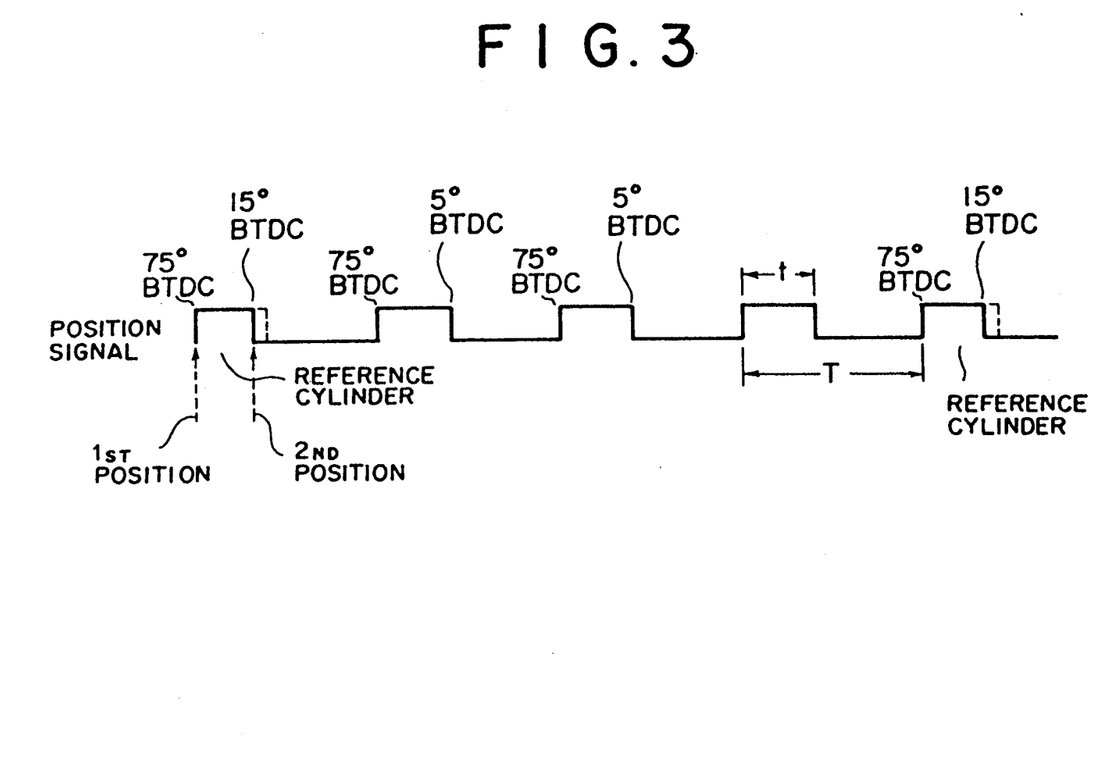
FIG. 3 is a waveform diagram of the output signal of a rotational position sensor which enables a reference cylinder to be identified.

In the example of FIG. 1, the output pulses of the rotational position sensor are all identical. However, in some automobiles, the rotational position sensor generates a different type of output signal which enables identification of a prescribed reference cylinder of the engine. As shown in FIG. 3, which illustrates such an output signal, the number of degrees of crankshaft rotation between the rising and falling edges of a pulse is different for the reference cylinder than for the other cylinders. For example, in FIG. 3, the falling edge of a pulse corresponding to the reference cylinder occurs at 15° BTDC, whereas it occurs at 5° BTDC for the other cylinders. Thus, the falling edge of the pulse corresponding to the reference cylinder is offset by 10° with respect to the other pulses. The duty cycle of a pulse corresponding to the reference cylinder is therefore different from the duty cycle of pulses for the other cylinders. By monitoring the duty cycle, the reference cylinder can be identified.

However, it is difficult to perform ignition timing braking with an ignition system which generates a rotational position signal of the type illustrated in FIG. 3. Therefore, with this type of rotational position signal, misfiring and other ignition problems occur when the engine rotational speed suddenly increases.

SUMMARY OF THE INVENTION

Accordingly, it is an object of this invention to provide an ignition timing control apparatus for an internal combustion engine which can prevent problems such as misfiring when the engine rotational speed suddenly increases.

An ignition timing control apparatus for a multi-cylinder internal combustion engine according to the present invention is equipped with a position sensor for generating a series of signals, each signal corresponding to one of the cylinders of the engine and indicating a first position and a second position with respect to top dead center of a piston of the corresponding cylinder. The number of degrees of crankshaft rotation between the first and second positions is different for a prescribed reference cylinder of the engine than for the other cylinders of the engine. A cylinder recognizing means recognizes the reference cylinder based on the signal from the position sensor. An ignition timing calculating means calculates a target ignition timing. An ignition timing braking means performs ignition timing braking if the target ignition timing falls in a prescribed braking period and the ignition has yet to take place when a piston reaches its second position. A braking period adjusting means changes the length of the braking period from a reference length to a different length depending on which cylinder is firing and on whether cylinder recognition has yet to take place.

In one form of the present invention, the second position of the piston of the reference cylinder is offset in the advance angle direction with respect to the second position of the pistons of the other cylinders. When cylinder recognition has yet to be completed by the cylinder recognizing means, the braking period adjusting means makes the braking period for each cylinder shorter than a reference length. When cylinder recognition has already been completed by the cylinder recognition means, the braking period for only the reference cylinder is shortened, while the braking period for all the other cylinders is set equal to the reference length.

In another form of the present invention, the second position of the piston of the reference cylinder is offset in the lag angle direction with respect to the second position of the pistons of the other cylinders. Prior to cylinder recognition, the braking period has the reference length for each cylinder. After cylinder recognition has been completed, the braking period for the reference cylinder is made longer than the reference braking period, while the braking period for the other cylinders has the reference length.

In preferred embodiments, the cylinder recognizing means, the ignition timing braking means, the braking period adjusting means, and the ignition timing calculating means are constituted by a microcomputer.

DESCRIPTION OF THE PREFERRED EMBODIMENTS

Figure 4:
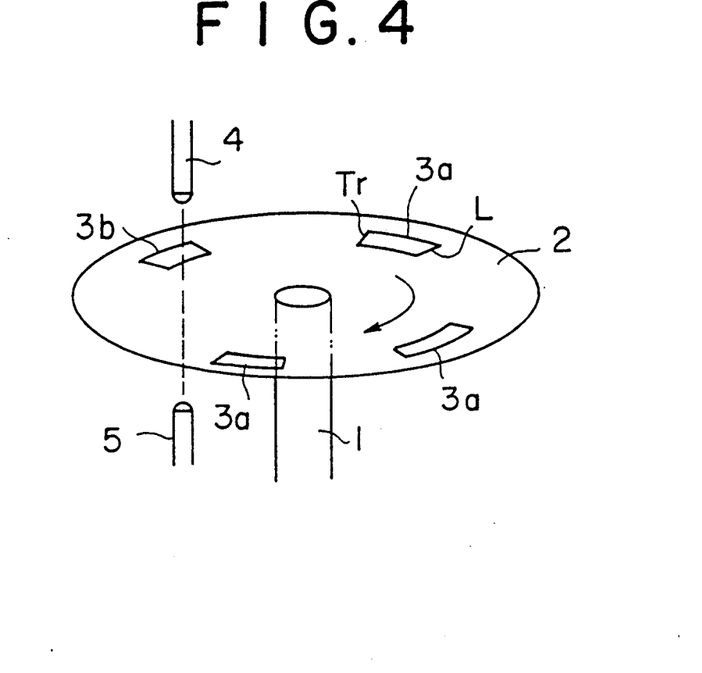
FIG. 4 is a schematic illustration of a portion of a rotational position sensor for use in the present invention.

A number of preferred embodiments of the present invention will now be described while referring to the accompanying drawings. FIG. 4 is a schematic perspective view of a portion of a rotational position sensor which can be employed in the present invention for sensing the position with respect to top dead center of the piston of each cylinder of an engine. As shown in this figure, the position sensor has a rotating shaft 1 which is rotated in synchrony with an unillustrated four-cylinder engine. The rotating shaft 1 can be, for example, the shaft of a distributor which is rotated by the cam shaft of the engine in the direction indicated by the arrow. A rotating disk 2 having a plurality of slits 3a and 3b formed in it is secured to the shaft 1 at the center of the disk 2. Each of the slits 3a or 3b corresponds to one of the cylinders of the engine, so for a four-cylinder engine, the disk 2 has four slits. The slits 3a and 3b are equally distant from the center of the rotating disk 2. Three of the slits 3a have the same length as one another in the circumferential direction of the disk 2, while the fourth slit 3b has a different length from the other slits 3a. The fourth slit 3b functions as a reference slit and corresponds to a reference cylinder of the engine. The fourth slit 3b is illustrated as being shorter in the circumferential direction of the disk 2 than the other slits 3a, but it could instead be made longer than the others. Each of the slits 3a and 3b has a leading edge L and a trailing edge Tr. The leading edges L of all four slits 3a and 3b are equally spaced around the disk 2 at intervals of 90 degrees. However, since the fourth slit 3b is shorter than the other slits 3a, its trailing edge is offset by a prescribed angle (10 degrees, for example, as measured from the center of the disk 2) with respect to the trailing edges Tr of the other slits 3a.

A light source in the form of a light emitting diode 4 and a light sensor in the form of a phototransistor 5 are aligned with one another on opposite sides of the rotating disk 2. When one of the slits 3a or 3b is aligned with the light emitting diode 4 and the phototransistor 5, the phototransistor 5 turns on, while at other times it is off.

Figure 5:
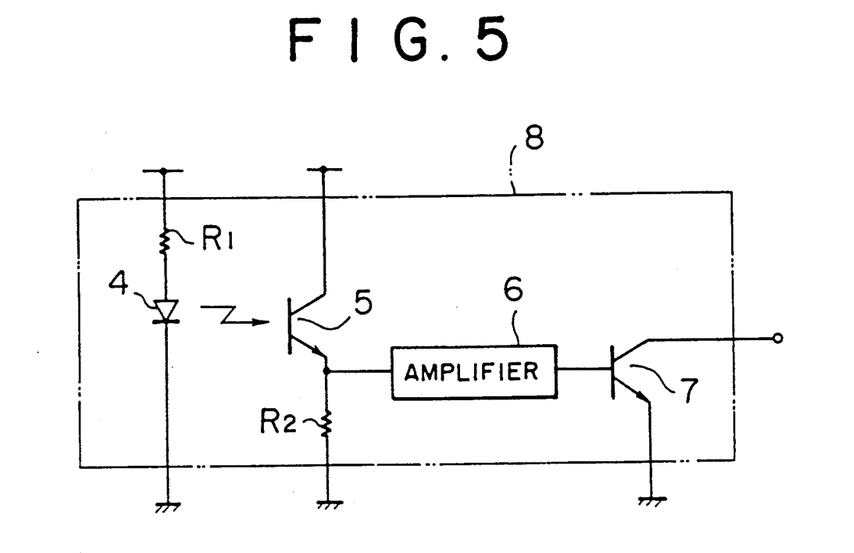
FIG. 5 is a circuit diagram of the rotational position sensor of FIG. 4.

The rotational position sensor, which includes the elements illustrated in FIG. 4, is shown schematically in FIG. 5 and is indicated by reference numeral 8. When the light which is generated by the light emitting diode 4 passes through one of the slits 3a or 3b of the disk 2 and strikes the phototransistor 5, the phototransistor 5 conducts and current flows through the phototransistor 5 and a resistor R2 which is connected to the emitter of the phototransistor 5. An amplifier 6 amplifies the voltage across the resistor R2 and provides the amplified signal to the base of an open-collector output transistor 7.

FIG. 3 illustrates the output signal of the rotational position sensor 8. The output signal is in the form of pulses having a rising edge corresponding to the leading edge L and a falling edge corresponding to the trailing edge Tr of each slit of the disk 2. In FIG. 3, a rising edge of an output pulse occurs when the piston of the corresponding cylinder is at 75° BTDC. For all but the reference cylinder, the falling edge occurs when the piston of the corresponding cylinder is at 5° BTDC, but for the reference cylinder, the falling edge occurs when its piston is at 15° BTDC. However, the piston positions corresponding to the rising and falling edges of the pulses in FIG. 3 are just examples, and different values can be employed. The pulses have a period T and a pulse width t.

Figure 6:
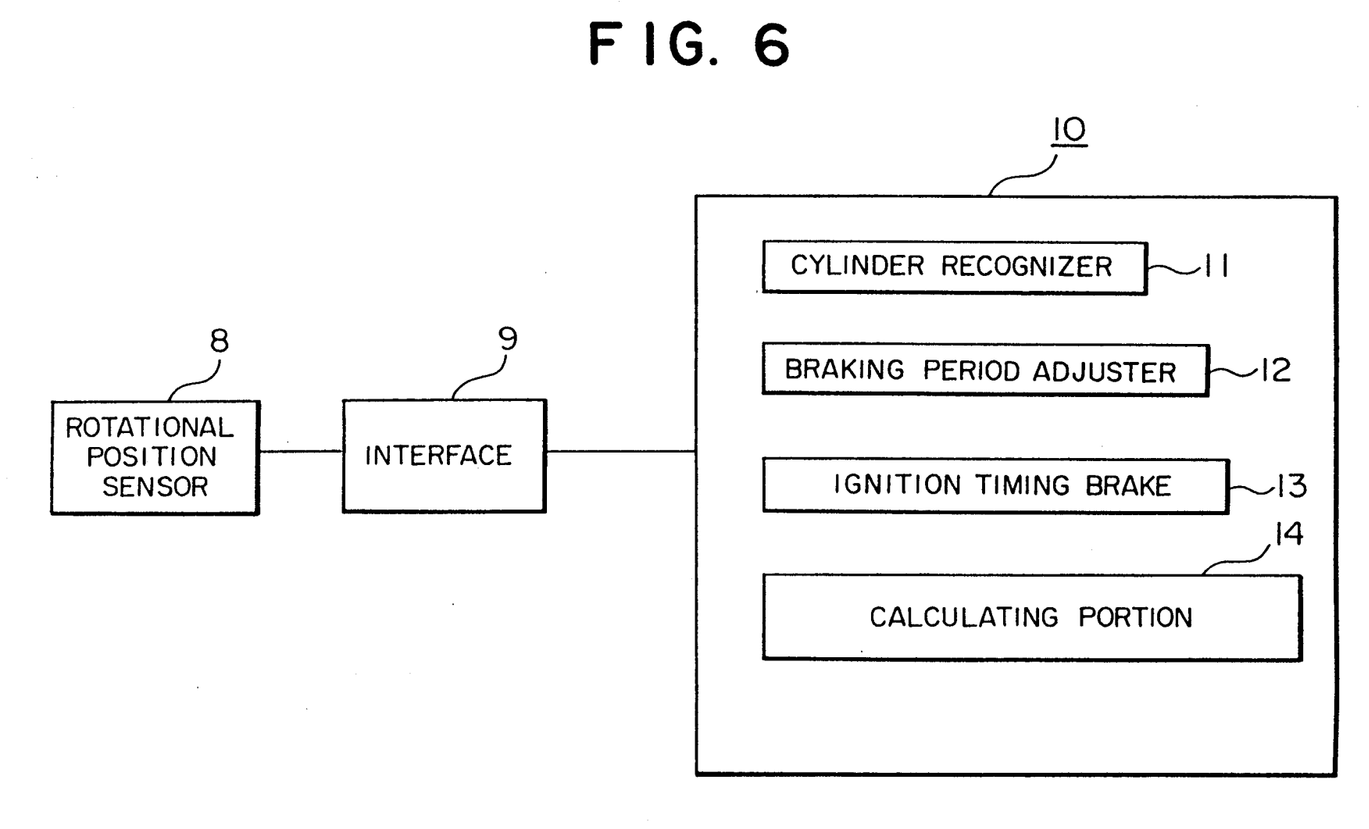
FIG. 6 is a block diagram of an ignition timing control apparatus according to the present invention.

As shown in FIG. 6, the output signal of the position sensor 8 is input to a microcomputer 10 via an interface 9. The microcomputer 10 includes a cylinder recognition portion 11, a braking period adjusting portion 12, an ignition timing braking portion 13, and an ignition timing calculating portion 14. The cylinder recognition portion 11 of the microcomputer 10 determines whether each pulse of the output signal of the position sensor 8 corresponds to the reference cylinder or to one of the other cylinders of the engine by comparing the ratio t/T or t/(T-t) for each pulse with a reference value. Since the number of degrees of crankshaft rotation between the rising and falling edges of the pulse corresponding to the reference cylinder is less than for the other cylinders, t/T or t/(T-t) is less for the reference cylinder than for the other cylinders, and the microcomputer 10 can easily recognize the reference cylinder.

The braking period adjusting portion 12 adjusts the length of a period referred to as the braking period A. The braking period A has a length corresponding to a prescribed number of degrees of crankshaft rotation measured from the rising edge of a pulse of the rotation position sensor 8. Normally, the braking period A has a predetermined reference length Ao equal to the number of degrees of crankshaft rotation between the rising and falling edges of a pulse of one of the cylinders other than the reference cylinder. In this embodiment, the reference length Ao equals 70° of crankshaft rotation (75° BTDC to 5° BTDC).

If the target ignition timing for the unillustrated engine falls during the braking period A, ignition timing braking can be performed. Otherwise, ignition timing braking is not performed.

The braking period adjusting portion 12 changes the length of the braking period A from the reference length Ao to a first length A1 which is shorter than the reference length Ao under the following conditions. First, if cylinder recognition has yet to be completed, the length of the braking period A is changed to the first length A1 for each cylinder. Second, if cylinder recognition has been completed, then the length of the braking period A is changed to the first length A1 only for the reference cylinder, while it remains at the reference length Ao for the other cylinders. In this embodiment, the first length A1 equals the number of degrees of crankshaft rotation between the rising and falling edges of the pulse for the reference cylinder (75° BTDC to 15° BTDC), which is 60°.

The ignition timing braking portion 13 performs ignition timing braking, i.e., it cuts off the current of an unillustrated ignition coil and forces ignition to take place. Ignition timing braking is performed when the target ignition timing falls within the braking period A, and ignition has yet to take place by the falling edge of an output pulse of the rotational position sensor 8.

The ignition timing calculating portion 14 calculates the target ignition timing and the time at which the unillustrated ignition coil for the engine starts conducting.

Figure 7:
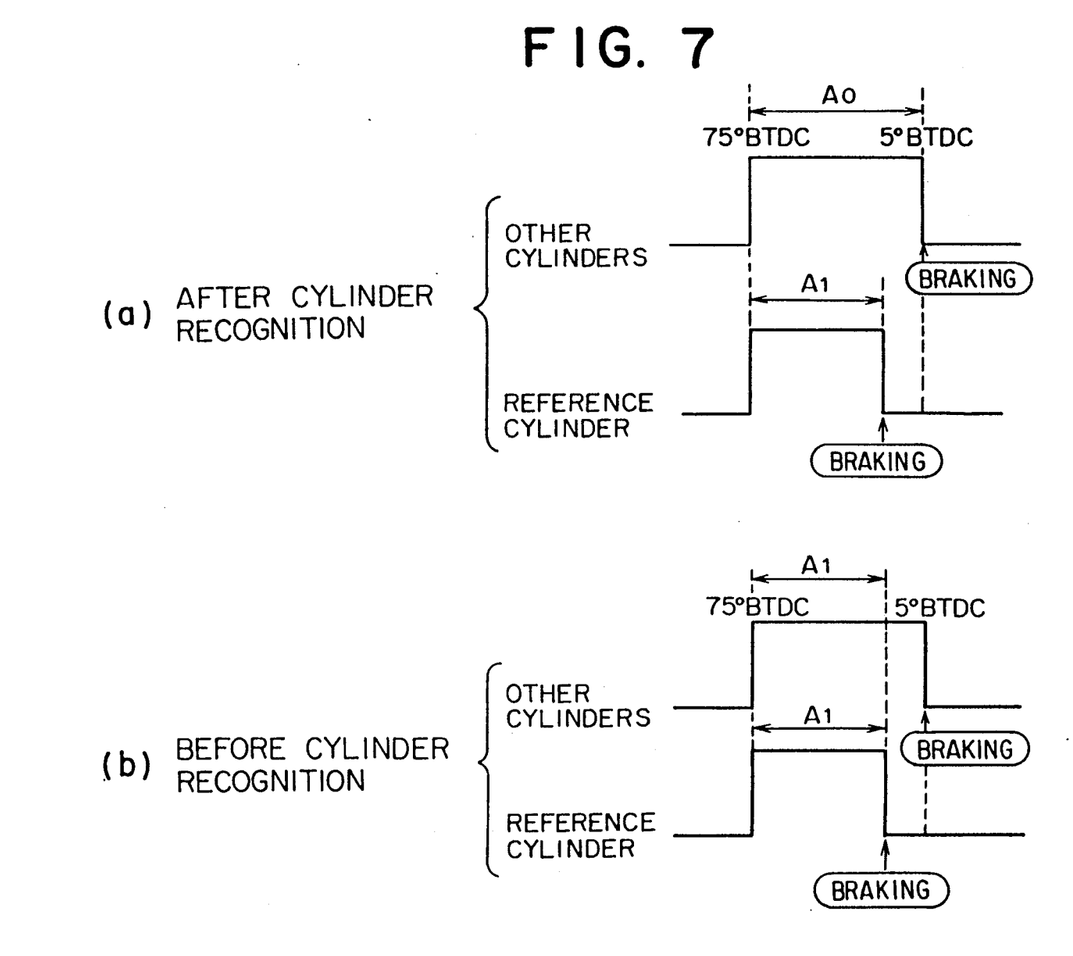
FIG. 7 shows output pulses of the rotational position sensor 8 corresponding to the reference cylinder and the other cylinders and the braking period A during which the target ignition timing must fall in order for ignition timing braking to be carried out in this embodiment.

The principles of the operation of the present invention will be explained while referring to FIG. 7, which shows the output pulses of the rotational position sensor 8 for the reference cylinder (short pulse) and for the other cylinders (long pulse). Ao and A1 indicate the length of the braking period A in different situations. Ao is the reference length corresponding to 70° of crankshaft rotation, and A1 is the first length corresponding to 60° of crankshaft rotation. If the target ignition timing is set to fall within the braking period A (for example, if the target ignition timing is 20° BTDC), then ignition timing braking may be performed by the ignition timing braking portion 13. However, if the target ignition timing is set to occur outside of the braking period A (for example, at TDC), then ignition timing braking is not performed, since ignition timing braking would cause ignition to occur prematurely.

In this embodiment, the output pulse corresponding to the reference cylinder is shorter than the other pulses, so the braking period A for the reference cylinder should be shorter than the braking period A for the other cylinders. After the cylinders have been recognized by the cylinder recognition portion 11, the length of the braking period A is set to the first length A1 for the reference cylinder and to the reference length Ao for the other cylinders, as shown in FIG. 7a. However, before cylinder recognition has been completed, it is impossible to make the length of the braking period A different for the reference cylinder than from the other cylinders. Therefore, prior to cylinder recognition, the length of the braking period A is set to the first length A1 for each cylinder, as shown in FIG. 7b.

Figure 8:
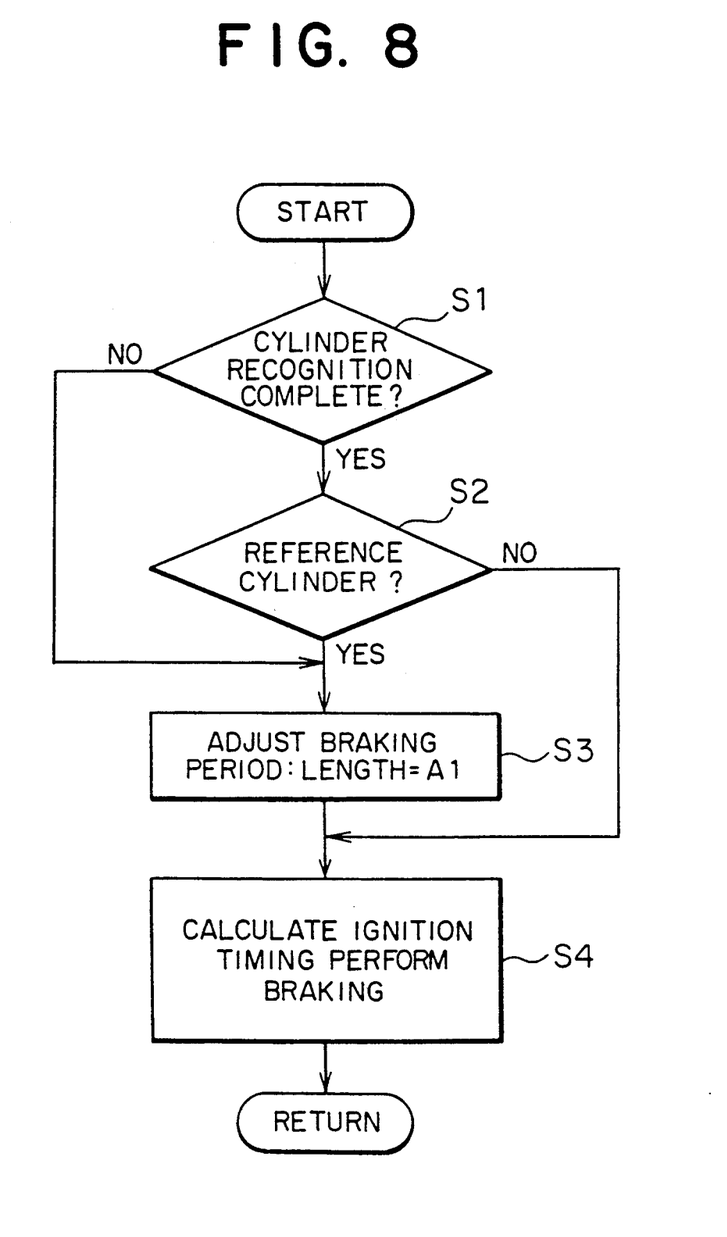
FIG. 8 is a flow chart of the operation of the apparatus of FIG. 6.

FIG. 8 is a flow chart of the operation of the microcomputer 10. In Step S1, it is determined whether the cylinder recognition portion 11 has completed cylinder recognition. If it has not been completed, then Step S2 is bypassed and Step S3 is performed. In Step S3, the braking period adjusting portion 12 of the microcomputer 10 changes the length of the braking period A from the reference length Ao to the first length A1. Shortening the length of the braking period A prevents an abnormal ignition advance angle for the reference cylinder. If the braking period A were not adjusted and the ignition timing were set at between 15° BTDC and 5° BTDC, during the firing of the reference cylinder, ignition timing braking would take place at 15° BTDC, which is prior to the target ignition timing. In Step S4, the ignition timing braking portion 13 of the microcomputer 10 performs ignition timing braking if ignition has yet to take place by the falling edge of an output pulse of the position sensor 8 in order to prevent an abnormal lag angle when the engine speed suddenly increases. In addition, the ignition timing and the time at which the ignition coil of the engine starts conducting are calculated by the calculating portion 14 of the microcomputer 10.

In Step S1, if cylinder recognition has been completed, then in Step S2, it is determined whether the output pulse which was most recently output by the rotational position sensor 8 corresponds to the reference cylinder. If it does not correspond to the reference cylinder, then Step S3 is bypassed, and in Step S4, ignition timing braking is performed and the ignition timing and the time at which the ignition coil starts conducting are calculated.

In Step S2, if the pulse corresponds to the reference cylinder, then in Step S3, the length of the braking period A for the reference cylinder is changed from the reference length Ao to the first length A1, after which Step S4 is performed.

Figure 9:
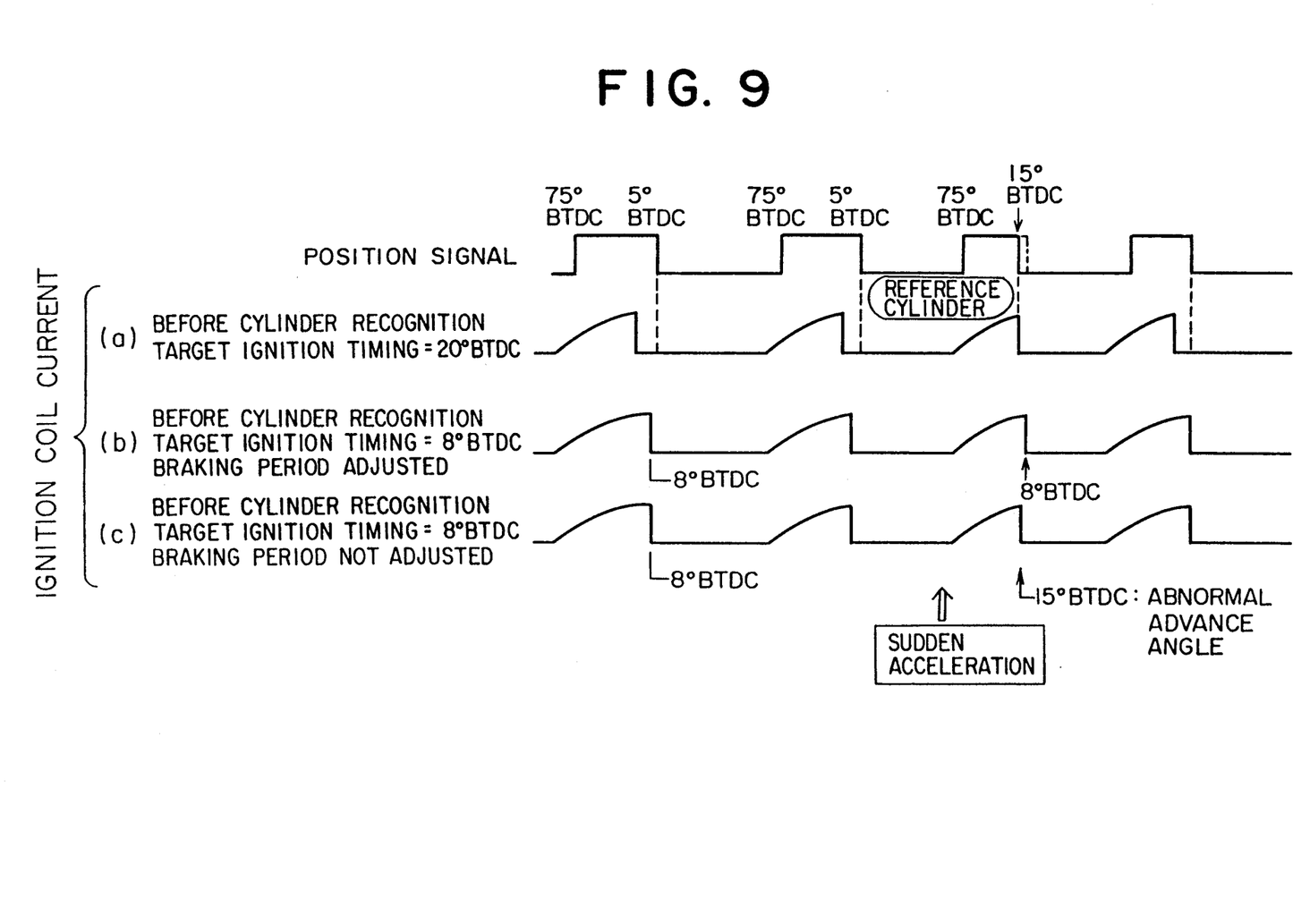
FIG. 9 is a waveform diagram showing the output signal of the rotational position sensor of FIG. 5 and the ignition coil current.

FIG. 9 shows the output signal of the rotational position sensor 8 and the ignition coil current for various settings of the target ignition timing. FIG. 9a shows the ignition coil current prior to the completion of cylinder recognition when the target ignition timing is set at 20° BTDC. In this case, the length of the braking period A is set to the first length A1 for each cylinder, so the braking period A extends from 75° BTDC to 15° BTDC. If the engine speed suddenly increases prior to the firing of the reference cylinder, engine timing braking will be performed upon the falling edge of the pulse for the reference cylinder, and ignition will take place at 15° BTDC, thereby preventing excessively late ignition.

FIG. 9b shows the ignition coil current prior to the completion of cylinder recognition when the target ignition timing is set at 8° BTDC. In this case, the target ignition timing falls outside of the braking period A (75° BTDC to 15° BTDC), so ignition timing braking is not performed. Therefore, if sudden acceleration occurs prior to the firing of the reference cylinder, ignition will take place later than the target timing, but there is no possibility of it taking place too early due to ignition timing braking.

For comparison, FIG. 9c shows the ignition coil current prior to completion of cylinder recognition in a conventional ignition system in which braking period adjustment is not performed. In this case, the braking period A is maintained at the reference length Ao for each cylinder. The target ignition timing is set at 8° BTDC, and therefore falls during the braking period A (75° BTDC to 5° BTDC), so ignition timing braking may be performed for each cylinder. Therefore, for the reference cylinder, ignition timing braking will take place at 15° BTDC, and ignition will occur well before the target ignition timing of 8° BTDC, possibly resulting in misfiring of the reference cylinder. This problem due, not occur with the present invention.

Figure 10:
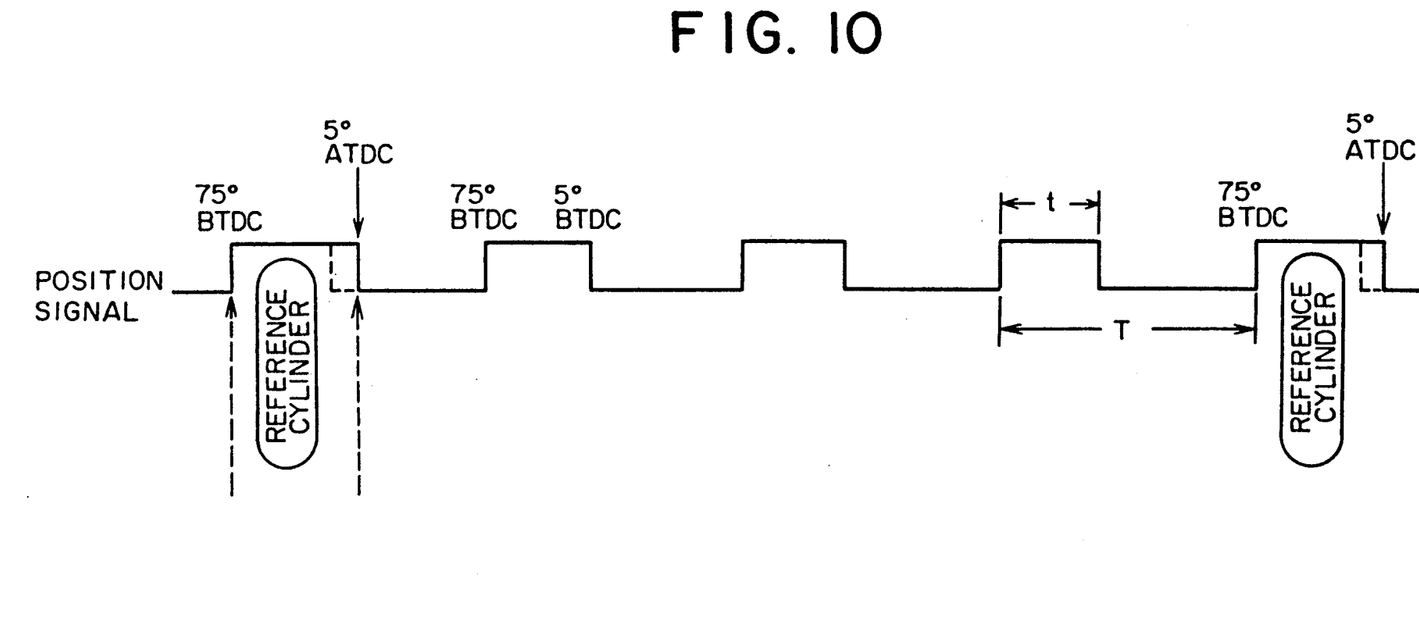
FIG. 10 is a waveform diagram of the output signal of a rotational position sensor employed in a second embodiment of the present invention.

In the rotational position sensor 8 of FIG. 4, the fourth slit 3b of the rotational position sensor 8 of FIG. 4 is shorter in the circumferential direction of the disc 2 than the other slits 3a. As a result, the falling edge of the output pulse of the rotational position sensor 8 corresponding to the reference cylinder occurs earlier with respect to top dead center (15° BTDC) than do the falling edges of the output pulses corresponding to the other cylinders (5° BTDC). In a second embodiment of the present invention, the fourth slit 3b is made longer in the circumferential direction than the other slits 3a, and the output signal of the rotational position sensor 8 is as shown in FIG. 10. In this embodiment, the falling edge of the output pulse corresponding to the reference cylinder occurs at 5° ATDC, while the falling edges of the pulses corresponding to the other cylinders occur at 5° BTDC. In this case, the ratio t/T or t/(T-t) for the pulse corresponding to the reference cylinder is longer than for the pulses corresponding to the other cylinders, so just as in the previous embodiment, the cylinder recognition portion 11 of the microcomputer 10 can recognize the reference cylinder by comparing the ratios for the pulses. With the exception of the relatives sizes of slits 3a and 3b, this embodiment has basically the same structure as the previous embodiment.

Figure 11:
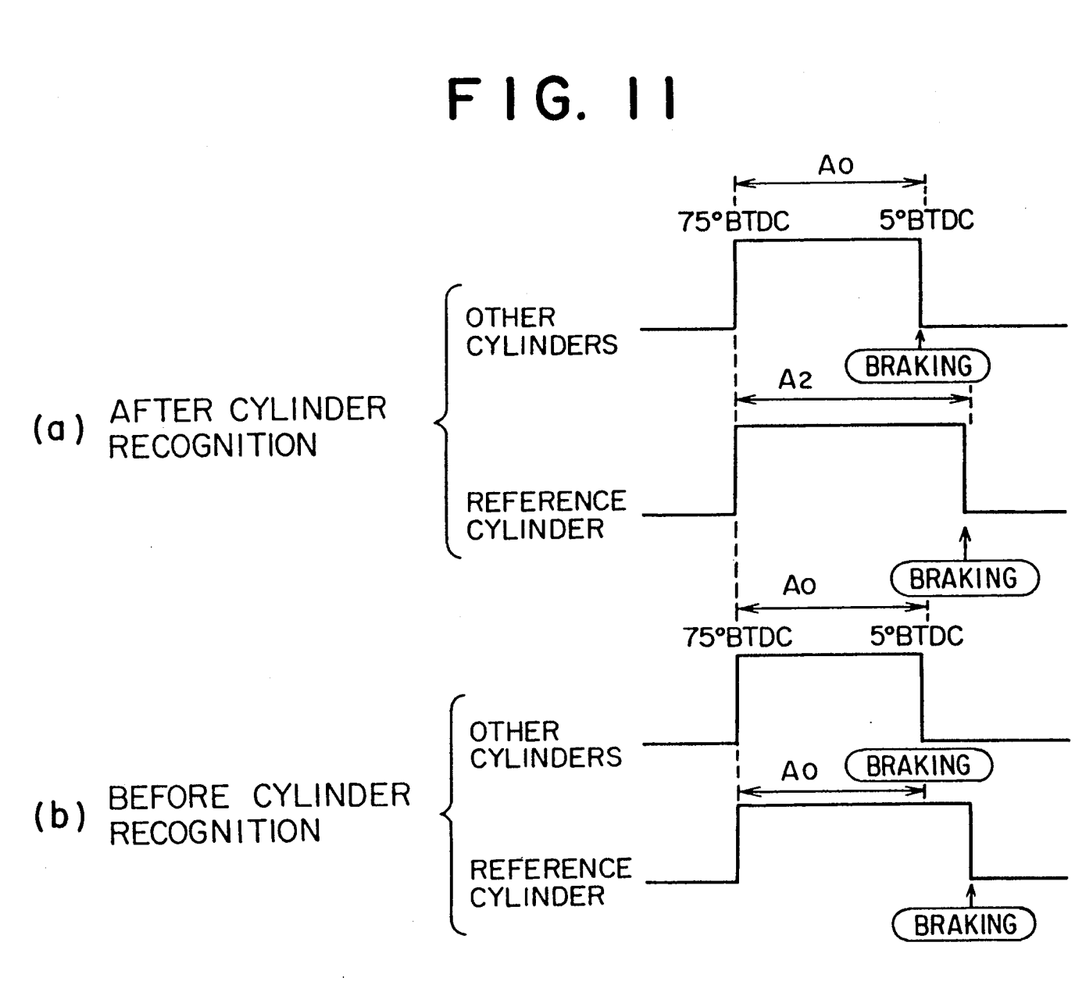
FIG. 11 shows output pulses of the rotational position sensor corresponding to the reference cylinder and the other cylinders and braking period A during which the target ignition timing must fall in order for ignition timing braking to be carried out in the second embodiment.
Figure 12:
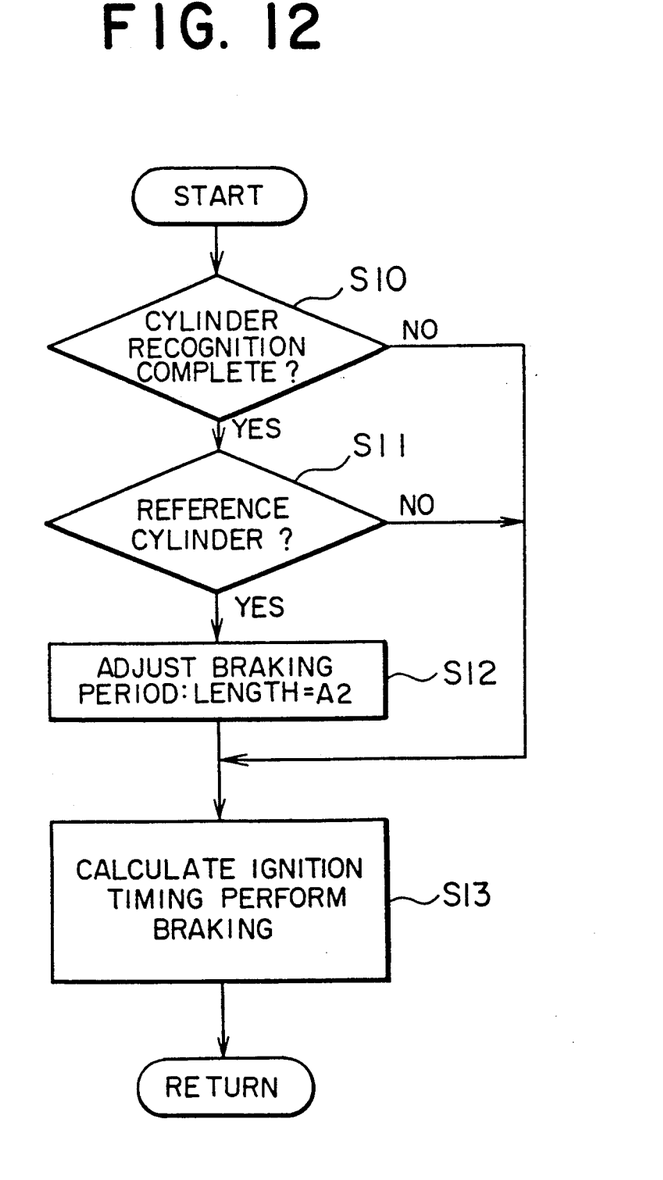
FIG. 12 is a flow chart of the operation of the second embodiment.

In this embodiment, the braking period A is adjusted in a different manner from in the preceding embodiment. The manner of braking period adjustment in this embodiment will be explained with reference to FIG. 11, which shows the output pulses of the rotational position sensor 8 for the reference cylinder (long pulse) and for the other cylinders (short pulse). Ao and A2 indicate the lengths of the braking period A. Ao is a reference length equal to 70° of crankshaft rotation, and A2 is a second length equal to 80° of crankshaft rotation. Prior to the completion of cylinder recognition, as shown by FIG. 12b, the length of the braking period A is set equal to the reference length Ao for all the cylinders. After cylinder recognition has been completed, the braking period adjusting portion 12 changes the length of the braking period A for the reference cylinder to the second length A2, while the length of the braking period A for the other cylinders remains at the reference length Ao. As in the preceding embodiment, ignition timing braking may be performed only if the target ignition timing is set to fall within the braking period A.

FIG. 12 illustrates a routine performed by the microcomputer 10 in this embodiment. First, in Step S10, it is determined whether the cylinder recognition portion 11 has completed cylinder recognition. If not, then Steps S11 and S12 are bypassed and Step S13 is performed. In Step S13, the ignition timing braking portion 13 of the microcomputer 10 performs ignition timing braking if the previously-described conditions for ignition timing braking are met. The ignition timing and the time at which the ignition coil starts conducting are also calculated by the calculating portion 14 of the microcomputer 10.

In Step S10, if cylinder recognition has been completed, then in Step S11, it is determined whether the output pulse which was most recently output by the rotational position sensor 8 corresponds to the reference cylinder. If it does not correspond to the reference cylinder, then Step S12 is bypassed, and in Step S13, ignition timing braking is performed, if necessary, and the ignition timing and the charging time for the ignition coil are calculated.

In Step S11, if the most recent output pulse of the rotational position sensor 8 corresponds to the reference cylinder, then in Step S12, the braking period adjusting portion 12 changes the length of the braking period A for the reference cylinder from the reference length Ao to the second length A2, after which Step S13 is performed.

Figure 13:
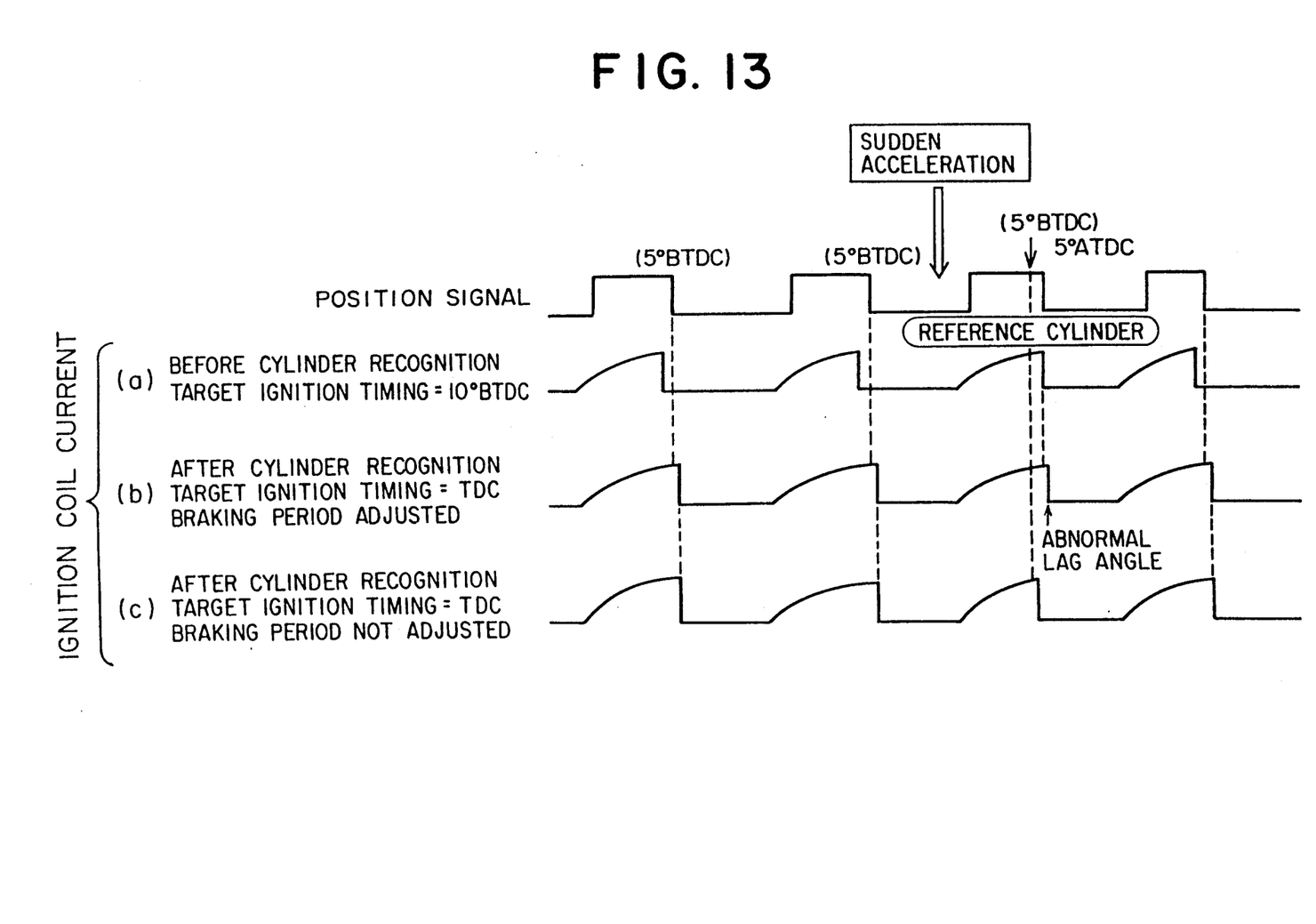
FIG. 13 is a waveform diagram showing the output signal of the rotational position sensor and the ignition coil current according to the second embodiment.

FIG. 13 shows the output signal of the rotational position sensor 8 and the ignition coil current before and after the completion of cylinder recognition. FIG. 13a shows the ignition coil current prior to the completion of cylinder recognition when the target ignition timing is set at 10° BTDC. In this case, the braking period A has the reference length Ao (75° BTDC to 5° BTDC) for each cylinder, so the target ignition timing falls during the braking period A. Therefore, if sudden acceleration occurs prior to the firing of the reference cylinder, ignition timing braking is performed, and ignition takes place upon the falling edge of the pulse of the reference cylinder, i.e., at 5° ATDC.

FIG. 13b shows the ignition coil current after the completion of cylinder recognition when the target ignition timing is set at TDC. At this time, the braking period A has the second length A2 (75° BTDC to 5° ATDC) for the reference cylinder and the reference length Ao (75° BTDC to 5° BTDC) for the other cylinders. As the target ignition timing does not fall during the braking period A for the other cylinders, ignition timing braking is not performed for the other cylinders and ignition takes place at the target timing, i.e., at TDC. However, as the braking period A for the reference cylinder has been adjusted to have the second length A2, ignition timing braking can be performed for the reference cylinder. Therefore, if the engine speed suddenly increases prior to the firing of the reference cylinder, ignition timing braking will take place at 5° ATDC, thereby preventing an abnormal lag angle.

For comparison, FIG. 13c shows the ignition coil current in a conventional ignition system which is not equipped with a braking period adjusting portion 12. In the absence of the adjusting portion 12, the length of the braking period A remains equal to the reference length Ao for each cylinder. Therefore, if the target ignition timing is set at TDC, ignition timing braking is not performed for any of the cylinders. If sudden acceleration takes place prior to the firing of the reference cylinder, since ignition timing braking does not take place, ignition will occur extremely late, i.e., subsequent to the falling edge of the reference pulse. This abnormally late ignition can cause misfiring or other ignition problems. These problems are avoided by the present invention.

From the preceding explanation, it can be seen that an ignition timing control apparatus according to the present invention can effectively perform ignition timing braking with respect to a complicated position signal of the type shown in FIG. 3 or FIG. 10. Therefore, premature and abnormally late engine ignition can be prevented both before and after the completion of cylinder recognition. As a result, misfiring and other ignition problems due to improper ignition timing are prevented.

What is claimed is:

1. An ignition timing control apparatus for a multi-cylinder internal combustion engine comprising:
- a position sensor for generating a series of position signals, each signal corresponding to one of the cylinders of the engine and indicating a first position and a second position with respect to top dead center of a piston of the corresponding cylinder, the number of degrees of crankshaft rotation of the engine between the first and second positions being different for a prescribed reference cylinder of the engine from that for the other cylinders of the engine;
- cylinder recognizing means for recognizing the reference cylinder based on the signals from the position sensor;
- ignition timing calculating means for calculating a target ignition timing;
- ignition timing braking means for performing ignition timing braking on a cylinder if (1) the target ignition timing falls during a predetermined braking period A for the cylinder, the braking period A being measured from the time when the piston of the cylinder is at its first position, and (2) ignition has yet to take place by the time the piston reaches its second position; and
- braking period adjusting means for changing the length of the braking period A from a prescribed first length to a prescribed second length for either of the reference cylinder and the other cylinders after cylinder recognition has been completed by the cylinder recognizing means.

2. An ignition timing control apparatus for a multi-cylinder internal combustion engine as claimed in claim 1, wherein the number of degrees of crankshaft rotation of the engine between the first and second positions for the prescribed reference cylinder is less than that for the remaining cylinders, and the braking period adjusting means changes the length of the braking period A for each cylinder from said prescribed second length Ao to said prescribed first length A1 when cylinder recognition has yet to be completed by the cylinder recognizing means, said prescribed second length Ao being greater than said prescribed first length A1.

3. An ignition timing control apparatus for a multi-cylinder internal combustion engine as claimed in claim 1, wherein the number of degrees of crankshaft rotation of the engine between the first and second positions for the prescribed reference cylinder is greater than that for the remaining cylinders, and the braking period adjusting means changes the length of the braking period A for the reference cylinder from a prescribed first length Ao to a prescribed second length A2 after cylinder recognition has been completed by the cylinder recognizing means, said prescribed second length A2 being longer than said prescribed first length Ao.

* * * * *